United States Patent Office 3,532,410
Patented Oct. 6, 1970

3,532,410
THEODOLITE ARRANGEMENT, PARTICULARLY FOR TRACKING FLYING OBJECTS
Ulrich La Roche, 18 Heilighusli,
8053 Zurich, Switzerland
Filed Feb. 5, 1968, Ser. No. 702,875
Int. Cl. G02b 21/00, 23/00
U.S. Cl. 350—19
15 Claims

ABSTRACT OF THE DISCLOSURE

A telescope of the Schmidt-Cassegrain type is mounted for turning movement about a horizontal axis on a carrier which is turnable about a vertical axis. Rays entering the telescope are deflected in the direction of the horizontal axis into a collimation objective mounted on the carrier means and guiding the rays along a horizontal path to form a secondary image in infinity. A plurality of cameras is mounted on the carrier means, and a deflecting prism is located behind the collimation objective and operable for deflecting the rays into different camers so that a single telescope can be used with several different cameras, for example motion picture cameras exposing different numbers of frames per second.

BACKGROUND OF THE INVENTION

Theodolites are known which are particularly constructed to track an airplane, rocket or other flying object, while the momentary values of the polar coordinates of the flying objects are continuously measured. Theodolites of this type are provided with cameras which at predetermined time intervals, for example every tenth second, automatically take a picture of the flying object, preferably with a reticle, such as crosshairs, superimposed on the picture. When a second tracking theodolite of the same type is simultaneously used for taking at the same time moment corresponding pictures of the flying objects at a different location, the two sequences of pictures can be used for mathematically determining the flight path of the flying object.

It is valuable for the interpretation of data, to have the possibility of photographing the flying objects with different motion picture cameras which operate to make disposures of different numbers of frames in the same time period. For example, high-speed film cameras can be used for photographing a particular phase of the flight of the flying objects at such a speed that the reproduction of the film will result in showing a flying object in slow motion. Television cameras may also be used instead of film cameras for momentarily transmitting the pictures of the flying object to a remote location for evaluation.

In order to be able to use different cameras for photographing different phases of the flight of the tracked flying object, it has been proposed to mount several cameras, each of which has a telescope objective, on a support mounted in the theodolite housing for turning movement about a horizontal axis, the theodolite housing being turnable about a vertical axis. By turning the support, selected cameras and telescopes can be placed in an operative position so that a specific camera type can be used in a particular situation which requires, for example, a camera producing slow-motion film, or a television camera.

This construction according to the prior art has certain disadvantages. Since the cameras are not an integral part of the theodolite housing but are mounted for turning movement on the same, it is difficult to combine the picture with the image of a reticle, or with representations of the polar coordinates in a truly accurate composite picture. For the same reason, it is difficult to avoid elastic deformations of the carriers during rapid angular accelerations, and the conquest measuring errors.

It is particularly difficult to provide each camera with a teleobjective of high resolution and great range, because telescopic systems of high quality are large, heavy and expensive.

SUMMARY OF THE INVENTION

It is one object of the invention to overcome the disadvantages of theodolite arrangements according to the prior art, and to provide a theodolite arrangement, particularly for tracking flying objects, which requires only a single telescopic objective for a plurality of different cameras.

Another object of the invention is to mount a telescope for turning movement about a horizontal axis on a carrier which is mounted for turning movement about a vertical axis, and carries a plurality of cameras into which the rays passing through the telescope can be selectively directed.

Another object of the invention is to use a telescope of the Cassegrain type, connected with a collimation objective which forms an image in infinity photographed by a selected camera.

Another object of the invention is to compensate the astigmatism of the telescope by selected astigmatic errors of the collimation objective. Another object of the invention is to provide means for superimposing on the pictures taken by a selected camera the image of a reticle, and representations of the azimuth, elevation, and moment of exposure.

With these objects in view, one embodiment of the invention comprises a carrier in the form of a theodolite housing, mounted for turning movement about a first axis; a telescope mounted on the carrier for turning movement about a second axis, and including optical means, preferably of the Cassegrain type, for forming a primary image of the field of view in a plane perpendicular to the second axis; a collimation objective mounted on the carrier for guiding rays from the telescope along the second axis to form a secondary image in infinity; a plurality of cameras mounted on the carrier; and deflecting means, preferably a prism, mounted on the carrier behind the collimation objective, and being operable between a plurality of positions in which the rays enter different cameras.

In a preferred embodiment of the invention, the first axis is vertical and the second axis is horizontal. The optical means of the telescope form an aplanatic primary image and have astigmastism, and the collimation objective is aplanatic and has astigmatic errors selected to compensate the astigmatism of the optical means.

In one embodiment of the invention, a plurality of cameras is spaced about the axis about which the telescope turns, and a prism is disposed in the path of the trays passing through the collimation objective, and is turnable between a plurality of positions for deflecting the afocal bundle of rays into different cameras.

Filters and neutral wedge means are provided behind the collimation objective, and preferably different neutral wedges are automatically placed in an operatvie position in accordance with the amount of light available.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
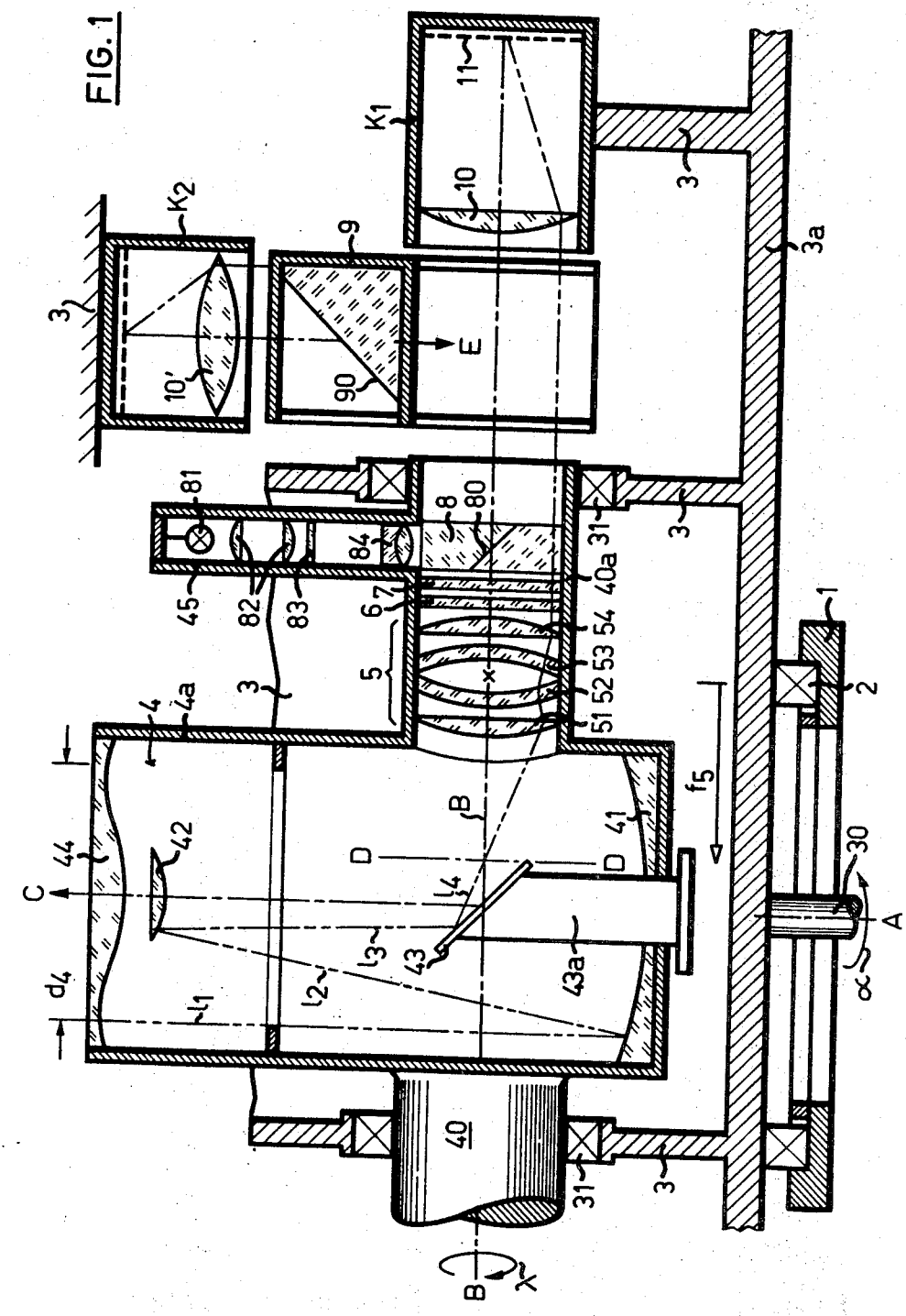
FIG. 1 is a vertical sectional view illustrating a theodolite arrangement according to one embodiment of the invention including a turnable telescope and two cameras.

Referring first to FIG. 1, a base, not shown, has a guide ring 1 on which the base plate 3a of a carrier in the form of a theodolite housing 3 is mounted for turning movement about an axis A by means of antifriction bearings 2. A drive shaft 30 is coaxial with the vertical axis A and secured to carrier 3 for rotating the same about A. A torque motor, not shown, is preferably used for rotating drive shaft 30. The theodolite housing 3 has walls supporting bearings 31 in which two shaft portions 40 and 40a, connected with the tube 4a of a telescope 4, are mounted for rotation about a horizontal axis B so that telescope 4 also turns about axis B. A torque motor, not shown, is connected to shaft portion 40 for rotating telescope 4 about axis B. Known tracking apparatus, not shown, is provided for driving the torque motors, not shown, and thereby rotating the carrier or theodolite housing 3 an azimuth angle $\alpha$ out of an initial position, while shaft 40 is turned with the telescope an angle $\lambda$ out of an initial position.

Standard measuring means as used in standard theodolites are provided for measuring the azimuth and elevation angles of an object in the field of view of telescope 4.

Telescope 4 has optical means in its tube 4a by which an aplanatic primary image is formed in a plane D—D which is perpendicular to the horizontal axis B about which the telescope 4 is turnable.

The optical means of the telescope include a corrector disc 44 of varying thickness closing the open front end of telescope tube 4a, a mirror at the closed rear end of tube 4a having a first mirror surface concave to the front, a second mirror in the proximity of corrector plate 44 and having a second mirror surface 42 convex to the rear, and a third mirror having a planar slanted mirror surface 43 located at the point of intersection of the optical axis C of the telescope with the horizontal turning axis B. The third mirror is supported on a cylidnrical rod 43a passing through the rear end of tube 4 and mirror 41. Corrector disc 44 and a second mirror surface 42 are ground so that the real primary image in the plane D—D is aplanatic corrected.

Telescopes provided with optical means as described and illustrated, are known as Schmidt-Cassegrain telescopes. Several types of Cassegrain telescopes are discussed in an article by Ronald R. Wiley, Jr., published in the issue of April 1962, pages 191–193, of the publication "Sky and Telescope."

A ray entering the open end of telescope tube 4a through corrector disc 44 is reflected by mirror surface 41, again reflected by mirror surface 42, and then reflected by the slanted mirror surface 43 to form the primary image in the plane D—D, whereupon the rays enter a collimation bojective 5 consisting of lenses 51, 52, 53, 54 located in the hollow tubular shaft portion 40a.

The optical system of telescope 4 is defined by the light path along $1_1$, $1_2$, $1_3$, and $1_4$. In a preferred embodiment of the invention, the total focal length of the telescope 4 is 2,400 mm., the diameter $d_4$ of the telescope is 400 mm., and the angle of the field of view is between 0.5° and 2°, and preferably 1°. The ratio between the total focal length of the optical system of the telescope, and the diameter of the same is in the illustrated example 6, but excellent results of the combination of the Schmidt-Cassegrain optical mirror system with the collimation objective 5 are obtained when the ratio between focal length and diameter of the telescope is within the range from 4 to 8.

Due to the fact that the collimation objective 5 is mounted in the tubular shaft portion 40a, it turns together with telescope 4 about the horizontal axis B, and the optical axis of collimation objectvie 5 coincides with axis B.

Lenses 51–54 of collimation objective 5 form a secondary image in infinity of the primary image in plane D—D. The projection is afocal, and the rays behind collimation objective 5 are parallel to the axis B.

In a preferred embodiment of the invention, the focal length $f5$ of the collimation objectvie 5 is 240 mm., so that a tenfold magnification of the image is obtained due to the fact that the focal length 2,400 mm. of the optical telescope system is ten times the focal length 240 mm. of the collimation objective. By selecting the optical systems differently, magnifications within the range from 7 to 15 can be obtained.

Collimation objective 5 is also aplanatic corrected, and designed in accordance with the optical system of telescope 4 so that the astigmatism of the optical system of the telescope, is compensated by suitably selecting the astigmatic error of the collimation objective 5, so that the combined optical systems are free of astigmatism.

The Schmidt-Cassegrain telescopic mirror optic combined with the collimation objective constitute an afocal teleobjective projecting parallel rays forming a magnified image of high quality in infinity.

Due to the fact that the image-forming rays are parallel, a camera in the path of the rays for photographing the image, need not be arranged at a particular distance from the collimation objective, and it is possible to provide in the path of the parallel rays between the collimation objective and a camera, for example the camera $K_1$, and preferably in the tubular shaft portion 40a, a filter disc 6, a neutral density wedge plate 7, and a prism 8 having a semitransparent mirror surface 80 slanted at an angle of 45° to axis B, which is also the optical axis of the collimation objective 5.

A tubular member 40 projects in radial directions from the tubular shaft portion 40a in region of prism 8. A lamp 81 in tubular member 45 projects light through condenser lenses 82, a diaphragm 83 with a reticle, such as crossing slits, and through a collimation lens means 84 so that an image of the reticle is reflected by the slanted mirror surface 80 toward the camera $K_1$, superimposed on the image represented by rays passing from collimation objective 5 through the semitransparent prism 8. Collimation lenses 84 superimpose the image of the reticle in infinity on the image of the field of view of telescope 4.

A slide 9 is located in the path of the rays from collimation objective 5 to camera $K_1$, and carries a prism with a mirror surface slanted at an angle of 45° to the axis B. In the position illustrated in FIG. 1, parallel rays pass through an open portion of slide 9 into camera $K_1$ so that the camera objective 10 forms a photographic image in the image plane 11 where a photographic film is located.

When slide 9 is shifted down to a position in which the slanted mirror surface 90 is located in the path of the rays, the same are deflected into a camera $K_2$, also mounted on carrier or theodolite housing 3, as schematically indicated, and having a camera objective 10' for photographing the image represented by the parallel rays from collimation objective 5 deflected by the deflecting means, 9, 10.

Due to the above-explained high magnification of the afocal teleobjective 4, 5, the exit pupil, which is the entrance pupil for the particular cameras, can be made correspondingly smaller, and if the magnification is tenfold, as in the above example, the entrance pupil of the cameras can be made ten times smaller so that inexpensive standard cameras can be used.

The term "camera" is used in the present application to include still cameras, motion picture cameras, such as electronically controlled high-speed camera producing per second between 10 and 30 exposures, and television cameras. Each film frame, or the television picture, will show the tracked aircraft, missile or other flying object, together with the superimposed reticle. Furthermore, the azimuth angle α, the elevation angle λ for the point of intersection of the crossing lines of the reticle, and the time at which the exposure on the respective frame was made, can also be superimposed on each frame for later evaluation.

Figure 2:
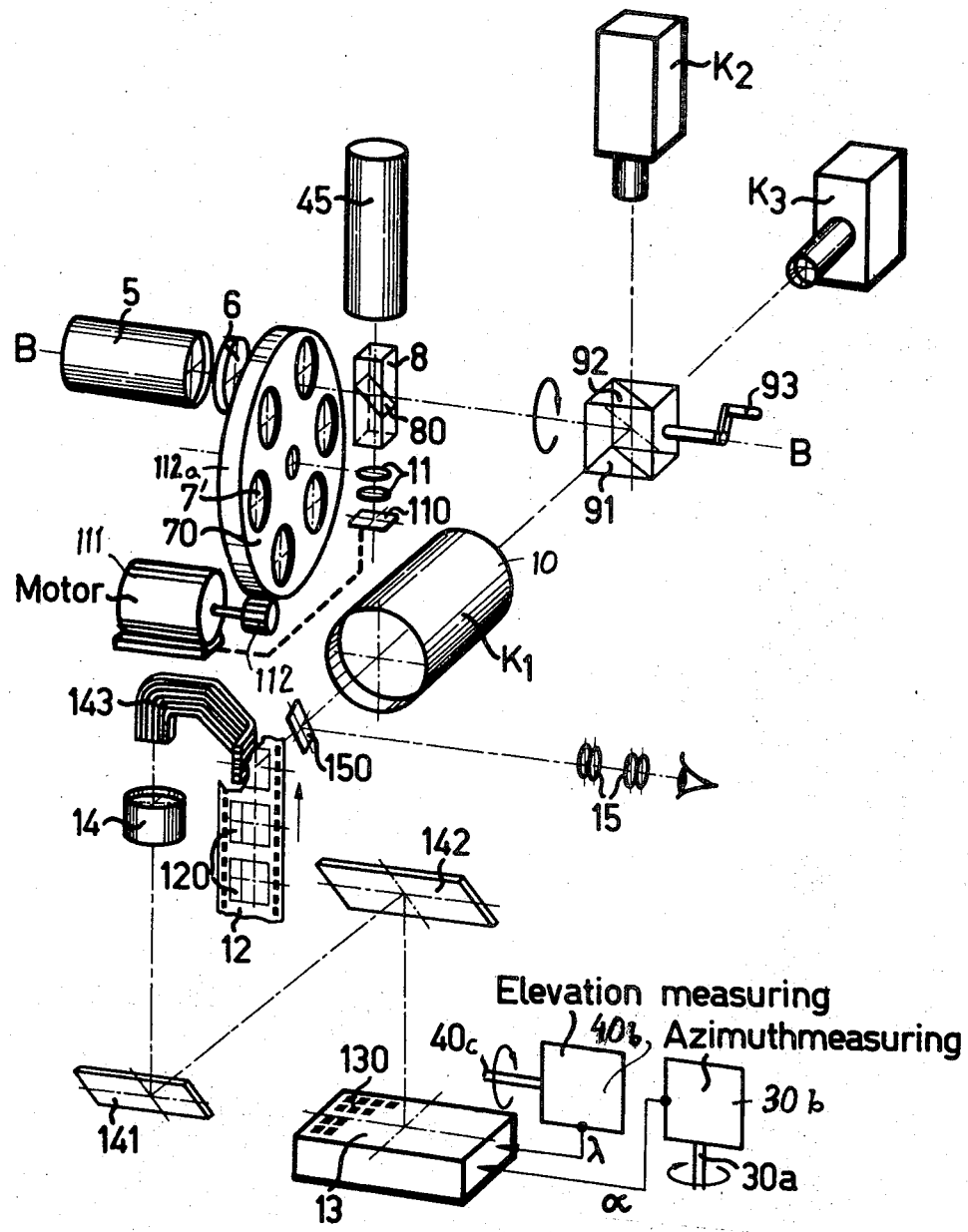
FIG. 2 is a schematic perspective exploded view illustrating a second embodiment of the photographic recording apparatus used with the telescope of the theodolite shown in FIG. 1.

FIG. 2 illustrates a modification of the theodolite arrangement shown in FIG. 1 by which informative data can be superimposed on the picture which is to be evaluated. The mounting of telescope 4 and collimation objective 5 is as explained with reference to FIG. 1, and only the right portion of FIG. 1 following the collimation objective 5 is modified in the arrangement of FIG. 1.

A color filter disc 6 is disposed in the axis B behind collimation objective 5. Instead of one neutral density wedge 7, several different neutral density wedges 7' are mounted on a support 70 which is turnable about an axis parallel to the axis B so that any selected neutral density wedge 7' can be placed in the optical axis B. A semitransparent prism 8 with a mirror surface 80 is provided for superimposing on the picture an image of a reticle in tube 45, as explained with reference to FIG. 1. The semitransparent slanted mirror surface 80 deflects rays passing through a neutral density wedge 7' through lenses 11 onto a photocell 110 which controls a servomotor 111 for turning support 70 by gears 112, 112a to a position in which a neutral density wedge 7' required by the available light is placed in an operative position located in the axis B. Consequently, a bundle of rays having the same predetermined average light intensity will reach one of the cameras $K_1$, $K_2$, $K_3$ which are spaced about the axis B angular distances of 90°.

A deflecting means in the form of a deviation prism 91 having a slanted mirror surface 92 is located in axis B at the point where a plane through the optical axis of cameras $K_1$, $K_2$, $K_3$ intersects the axis B. A handle 93 is provided for turning prism 91 between three positions. In the illustrated position, the light rays parallel to axis B are deflected by mirror surface 92 into the objective of camera $K_1$, and forms photographic pictures on consecutive frames 120 of a motion picture film 12. The picture on each frame 120 represents the field of view of the telescope 4, including the picture of the tracked flying object, with a cross-shaped reticle superimposed. When prism 91 is turned 90°, camera $K_2$ receives the rays, and after turning of further 90°, camera $K_3$ receives the rays for forming photographic pictures.

One of the cameras may be a television camera permitting instant viewing of the picture at a remote location, and the other camera may expose a different number of frames per second, or have other distinguishing features as compared with camera $K_1$.

An encoder or coding device 13 is controlled by measuring means which measure the azimuth angle, the elevation angle, and the time of exposure of each frame, and represent these data in coded form by light or dark areas on a surface 130. The measuring means include an elevation measuring means 40b connected by a shaft 40c with shaft 40, and an azimuth measuring means 30b connected by a shaft 30a with shaft 30. The coded representation of these data on surface 130 is reflected by mirrors 142, 141 into a lens 14 from which rays representing the code areas on surface 130 are guided by fiberglass light-guiding means 143 to corresponding areas on the frames 120 of film 12 so that the code areas of surface 13 are superimposed on the image of the field of view on the respective frame of the film. Consequently, each frame will show the tracked flying object, a superimposed picture of the reticle, and recordings representing the azimuth and elevation angles, as well as the time of exposure.

An auxiliary mirror 150 can be placed in the path of rays between the camera objective and the film, and permits viewing of the image through an occular 15 so that the quality of the picture can be visually checked by an observer.

It will be understood that each of the elements described above, or two or more together, may also find a useful application in other types of recording theodolites differing from the types described above.

While the invention has been illustrated and described as embodied in a theodolite arrangement in which a single telescope can be used with different cameras while tracking a flying object, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Theodolite arrangement, comprising, in combination, supporting means; carrier means mounted on said supporting means for turning movement about a first axis; a telescope mounted on said carrier means for turning movement about a second axis intersecting said first axis, said telescope including optical means for forming a primary image of the field of view in a plane perpendicular to said second axis; a collimation objective mounted on said carrier means for guiding rays from said optical means forming said primary image along a path parallel to said second axis to form a secondary image in infinity, and having an optical axis coinciding with said second axis; a plurality of cameras mounted on said carrier means; and deflecting means mounted on said carrier means for deflecting rays in said path, and being operable between a plurality of positions in which said rays enter different cameras.

2. Theodolite arrangement as claimed in claim 1 wherein said first axis is vertical; wherein said second axis is horizontal; and wherein said collimation objective is connected with said telescope for turning movement with the same about said second axis.

3. Theodolite arrangement as claimed in claim 1 wherein said optical means of said telescope form an aplanatic corrected primary image and have astigmatism; wherein said collimation objective is aplanatic; and wherein said collimation objective has astigmatic errors selected to compensate the astigmatism of said optical means.

4. Theodolite arrangement as claimed in claim 1 comprising a plurality of cameras spaced about said second axis; and wherein said deflecting means are movable between a plurality of positions located in said second axis for deflecting said rays into different cameras of said plurality of cameras.

5. Theodolite arrangement as claimed in claim 1 wherein said cameras are motion picture cameras producing a different number of exposures per time unit.

6. Theodolite arrangement as claimed in claim 1 wherein said telescope includes a tube having an open front end; and wherein said optical means include a first mirror surface concave to the front and located at the rear end of said tube, a transparent corrector disc of varying thickness in said open front end, a second mirror surface convex to the rear located rearward of said disc, said mirror surfaces having a common optical axis intersecting said second axis, and a third deflecting mirror surface located at the point of intersection of said common optical axis with said second axis at an angle to the same for deflecting rays reflected by said first and second mirror surfaces into said collimation objective in the direction of said second axis.

7. Theodolite arrangement as claimed in claim 1 wherein said telescope is of the Schmidt-Cassegrain type, said optical means including curved mirror surfaces, wherein the angle of field of said optical means is within the range from 0.5° and 2°, wherein the ratio between the total focal length of said optical means and the diameter of the front end opening of said telescope is between four and eight; and wherein the total focal length of said optical means is between seven times and fifteen times the focal length of said collimation objective.

8. Theodolite arrangement as claimed in claim 1 comprising a semitransparent mirror behind said collimation objective in said path of said rays; and the reticle means mounted on said carrier means radially spaced from said second axis for projecting the image of a reticle onto said semitransparent mirror so that the image of the reticle is superimposed on the secondary image and on the picture produced by said camera.

9. Theodolite arrangement as claimed in claim 1 and comprising filter means, and neutral density wedge means behind said collimation objective in said path of said rays.

10. Theodolite arrangement as claimed in claim 1 comprising a photographic film is said camera positioned to be exposed by said rays entering said camera; measuring means for measuring the turning angle of said carrier means about said first axis and the turning angle of said telescope about said second axis; and means controlled by said measuring means for recording said turning angles in visual form on said photographic film.

11. Theodolite arrangement as claimed in claim 10 wherein said means for recording said turning angles include a coding device controlled by said measuring means for representing said turning angles in the form of a coded picture, and optical means for projecting said coded picture onto said photographic film.

12. Theodolite arrangement as claimed in claim 10 comprising time measuring means; and means for recording the time of exposure of said photographic film on the same together with the recordings of the angles measured at the recorded time of exposure.

13. Theodolite arrangement as claimed in claim 1 comprising a plurality of neutral density wedges; a support for said neutral density wedges mounted on said carrier means for movement between a plurality of positions for placing each of the neutral density wedges in an operative position rearward of said collimation objective and in said path of rays; a servomotor for moving said support; and photosensitive means for sensing the amount of light passing through a neutral density wedge in said operative position, and operatively connected with said servomotor for causing movement of said support by the same to a position in which a neutral density wedge suitable for the amount of light entering said telescope and passing through said collimation objective is placed in said operative position.

14. Theodolite arrangement as claimed in claim 1 wherein said first axis is vertical; wherein said second axis is horizontal; wherein said collimation objective is connected with said telescope for turning movement with the same about said second axis; wherein said telescope includes a tube having an open front end; and wherein said optical means include a first mirror surface concave to the front and located at the rear end of said tube, a transparent corrector disc of varying thickness in said open front end, a second mirror surface convex to the rear located rearward of said disc, said mirror surfaces having a common optical axis intersecting said second axis, and a third deflecting mirror surface located at the point of intersection of said common optical axis with said second axis at an angle to the same for deflecting rays reflected by said first and second mirror surfaces into said collimation objective in the direction of said second axis; and comprising a semitransparent mirror behind said collimation objective in said path of said rays; and reticle means mounted on said carrier means radially spaced from said second axis for projecting the image of a reticle onto said semitransparent mirror so that the image of the reticle is superimposed on the secondary image and on the picture produced by said camera.

15. Theodolite arrangement as claimed in claim 14 wherein the angle of field of said optical means is within the range from 0.5° and 2°, wherein the ratio between the total focal length of said optical means and the diameter of the front end opening of said telescope is between four and eight; wherein the total focal length of said optical means is between seven times and fifteen times the focal length of said collimation objective; wherein said optical means of said telescope form an aplanatic corrected primary image and have astigmatism; wherein said collimation objective is aplanatic; and wherein said collimation objective has astigmatic errors selected to compensate the astigmatism of said optical means.

References Cited
UNITED STATES PATENTS 2,753,760   7/1956   Braymer _____ 350—19

RICHARD A. FARLEY, Primary Examiner

J. G. BAXTER, Assistant Examiner

U.S. Cl. X.R.

350—18